(12) United States Patent
Barrowes

(10) Patent No.: US 10,001,579 B2
(45) Date of Patent: Jun. 19, 2018

(54) HIGH FREQUENCY ELECTROMAGNETIC INDUCTION

(71) Applicant: Benjamin E Barrowes, Lyme, NH (US)

(72) Inventor: Benjamin E Barrowes, Lyme, NH (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 364 days.

(21) Appl. No.: 14/661,779

(22) Filed: Mar. 18, 2015

(65) Prior Publication Data

US 2017/0097439 A1    Apr. 6, 2017

(51) Int. Cl.
   *G01V 3/165*    (2006.01)

(52) U.S. Cl.
   CPC .................... *G01V 3/165* (2013.01)

(58) Field of Classification Search
   CPC ............................. G01V 3/101; G01V 3/165
   See application file for complete search history.

(56) References Cited

U.S. PATENT DOCUMENTS

| | | | |
|---|---|---|---|
| 4,679,560 A * | 7/1987 | Galbraith | A61N 1/37223 128/903 |
| 2017/0097439 A1* | 4/2017 | Barrowes | G01V 3/101 |

* cited by examiner

*Primary Examiner* — Douglas Menz
(74) *Attorney, Agent, or Firm* — Brian C. Jones

(57) ABSTRACT

A high-frequency electromagnetic induction system includes a frequency generator coupled to a transmitter coil, a receiver coil coupled to a processor and a high frequency and polarizability data profile for an object of interest. The high frequency and polarizability data profile includes a data object having an array of frequency values and magnetic polarizability values, which are obtained from the object of interest and processed by the processor. Also described is a method for populating the high frequency and polarizability data profile.

20 Claims, 2 Drawing Sheets

HIGH FREQUENCY ELECTROMAGNETIC INDUCTION

STATEMENT OF GOVERNMENT INTEREST

The invention described herein was made by an employee of the United States Government and which may be manufactured and used by the Government of the United States of America for governmental purposes without the payment of any royalties thereon or therefore.

BACKGROUND

1. Field of Invention

This invention relates to the electrical measurement and testing, and more specifically to instrumentation for detecting and identifying non-metallic objects.

2. Description of the Related Art

Metal detectors are electromagnetic induction devices that induce an electric current in an object to produce a magnetic field. The military relies heavily on metal detectors to locate land mines and explosive devices. Commercially available electromagnetic induction instruments, such as the GEM-3 from Geophex, can detect metal objects with electrical conductivities in a range of greater than 1 million Siemens per meter (S/m).

It is a problem known in the art that electromagnetic induction instruments cannot reliably detect non-metallic or low-metallic objects used to produce weapons and explosives. Nitrogen fertilizer, conductive polymers and carbon fiber are examples of non-metallic substances used to produce deadly explosive devices.

The US military has increased its use of carbon fiber explosive devices in recent years and is expected to continue to do so. Carbon fiber devices do not produce shrapnel and reduce collateral injuries caused by shrapnel. However, the carbon fiber casings cannot be detected by instrumentation known in the art.

There is an unmet need in the art for an electromagnetic induction instrument capable of detecting a wider range of explosive devices.

SUMMARY OF THE INVENTION

In accordance with one embodiment, a method for creating a high frequency and polarizability data profile for an object of interest includes the steps of instantiating a data object for an object of interest, wherein the data object includes an array to store a plurality of magnetic polarizability values $M_1$-$M_n$ and a plurality of frequency values $F_1$-$F_n$, and iteratively invoking a function n times. The function includes the steps of updating the frequency value $F_n$ to correspond to the frequency of a signal applied to a transmitter coil, receiving a measured background voltage $V_B$ and an initial background transmitter current $i_{T_i}^B$, receiving an measured ferrite voltage $V_F$ and an initial ferrite transmitter current $i_{T_i}^F$, and receiving an measured voltage of the object of interest $V_O$ and an initial transmitter current of object of interest $i_{T_i}^O$. The function then normalizes the initial background transmitter current $i_{T_i}^B$, the initial ferrite transmitter current $i_{T_i}^F$ and the initial transmitter current of object of interest $i_{T_i}^O$ to a coil background transmitter current $i_T^B$, a coil ferrite transmitter current $i_T^F$ and a coil transmitter current of the object of interest $i_T^O$, respectively, to adjust for sampling conditions. Next, the function calculates the magnetic polarizability value $M_n$ of the object of interest utilizing the measured background voltage $V_B$, the measured ferrite voltage $V_F$, the measured voltage of the object of interest $V_O$, the coil background transmitter current $i_T^B$, the coil ferrite transmitter current $i_T^F$ and the coil transmitter current of the object of interest $i_T^O$, and stores the magnetic polarizability value $M_n$ and the frequency value $F_n$ in the array to create the high frequency and polarizability data profile for the object of interest.

In accordance with another embodiment, a high-frequency electromagnetic induction system includes a frequency generator operatively coupled to a transmitter coil and a receiver coil operatively coupled to a processor configured to perform the above method for creating a high frequency and polarizability data profile for an object of interest.

In accordance with another embodiment, a computer storage medium is configured with at least one high frequency and polarizability data profile for an object of interest, the at least one high frequency and polarizability data profile including a data object for the object of interest wherein the data object includes an array storing a plurality of magnetic polarizability values $M_1$-$M_n$ and a plurality of frequency values $F_1$-$F_n$.

TERMS OF ART

As used herein, the term "array" means any systematic arrangement of data values. As used herein, the term array may include single or multiple arrays and may reflect data associations, pointers and multiple properties for stored data.

As used herein, the term "background" or refers to a signal or data not originating from the ferrite sample or object of interest.

As used herein, the term "data object" means a location in memory that specifies a particular aggregation of values and functions used to gather and process data to create a data profile.

As used herein, the term "data profile" or "profile" means two or more magnetic polarizability data values used to identify an object. A data profile may be stored in any data structure capable of storing magnetic polarizability data values.

As used herein, the term "frequency generator" means an apparatus configured to generate an electrical signal having at least one frequency.

As used herein, the term "high frequency" means frequencies between approximately 100 kHz and 50 MHz.

As used herein, the term "iterative" means the process of repeating a sequence of operations.

As used herein, the term "magnetic polarizability value" means a value directly proportional to the ability of a target object to be polarized by an external magnetic field.

As used herein, the term "normalizing" means adjusting values measured on different scales or systems to a common scale or system.

As used herein, the term "object of interest" means an object subject to or capable of detection.

As used herein, the term "sampling conditions" means differences as compared to a common scale or system.

As used herein, the term "updating" means changing and storing a value in a data object.

DETAILED DESCRIPTION OF INVENTION

Figure 1:
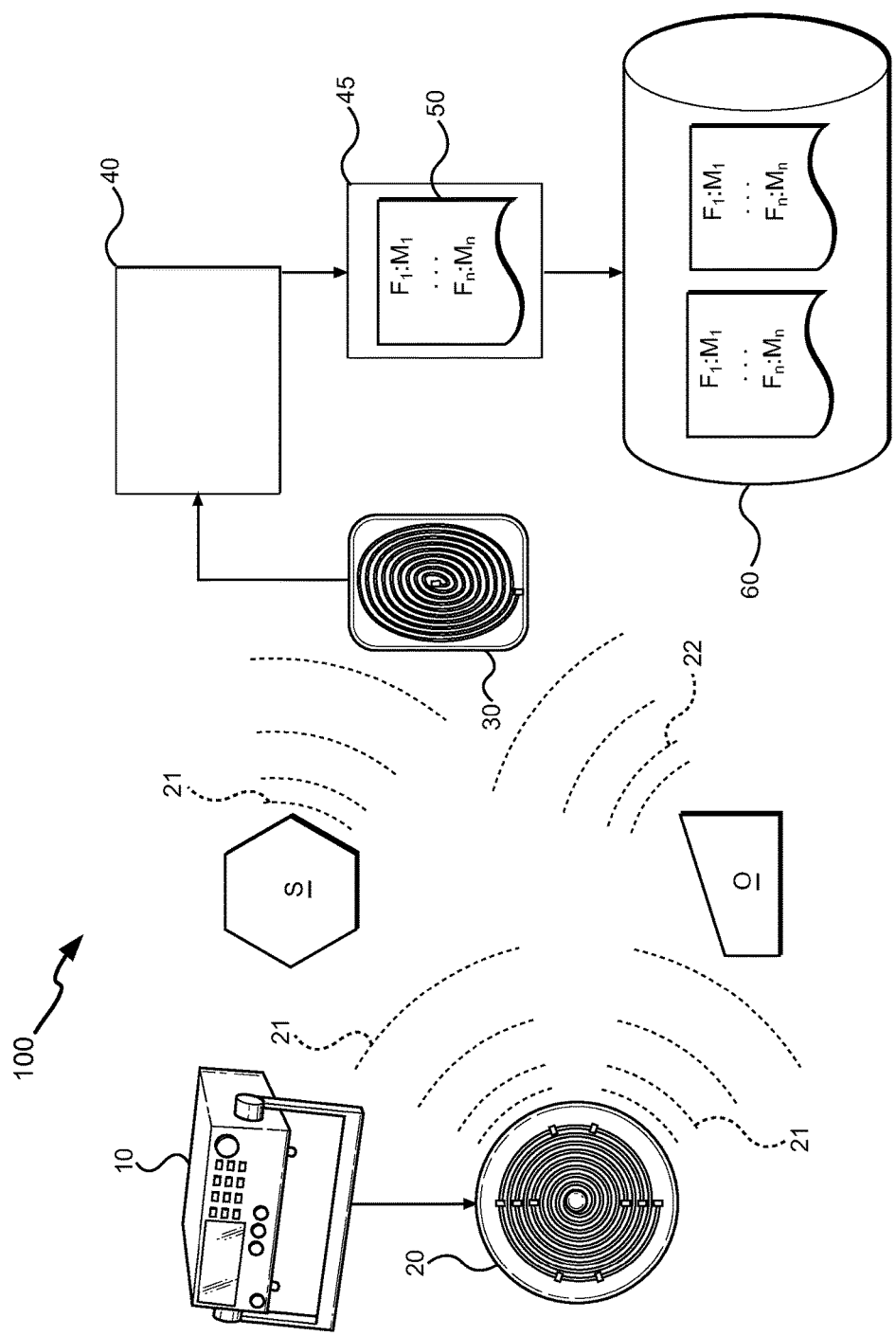
FIG. 1 illustrates an exemplary embodiment of a high-frequency electromagnetic induction system.

FIG. 1 illustrates an exemplary embodiment of a high-frequency electromagnetic induction system 100. System 100 includes a frequency generator 10, a transmitter coil 20, a receiver coil 30, a processor 40, a high frequency and polarizability data profile 50 and an optional searchable database 60.

In the exemplary embodiment shown, frequency generator 10 generates a sine wave at multiple frequencies ranging from approximately 100 kHz to approximately 15 MHz. In other embodiments, the frequency range may be extended to 50 MHz. The number of frequencies generated ranges from approximately 10 to approximately 200. Frequency generator 10 couples to transmitter coil 20, allowing transmission of the sine wave. In one embodiment, frequency generator 10 is an Agilent™ E5071C signal generator.

Transmitter coil 20 couples to frequency generator 10, allowing transmitter coil 20 to generate a primary magnetic field 21. Primary magnetic field 21 induces eddy currents in a known ferrite sample S or in an object of interest O having conduction of between approximately 1 S/m and approximately 100,000 S/m. These eddy currents, in turn, produce a secondary magnetic field 22.

Receiver coil 30 couples to processor 40, allowing it to receive secondary magnetic field 22 emitted in response to primary magnetic field 21 emitted by transmitter coil 20.

Processor 40 is operatively coupled to and receives data from receiver coil 30. Processor 40 is configured to receive the measured background voltage $\widehat{V_B}$, the initial background transmitter current $\widehat{i_{T_i}^B}$, the measured ferrite voltage $\widehat{V_F}$, the initial ferrite transmitter current $\widehat{i_{T_i}^F}$, the measured voltage of object of interest O $\widehat{V_O}$ and the initial transmitter current of object of interest O $\widehat{i_{T_i}^O}$. Processor 40 is also configured to normalize initial background transmitter current $\widehat{i_{T_i}^B}$, initial ferrite transmitter current $\widehat{i_{T_i}^F}$ and initial transmitter current of object of interest $\widehat{i_{T_i}^O}$ to a coil background transmitter current $\hat{i_T^B}$, a coil ferrite transmitter current $\hat{i_T^F}$ and a coil transmitter current of object of interest O $\hat{i_T^O}$, respectively, to adjust for sampling conditions.

Processor 40 is configured to iteratively calculate magnetic polarizability values $M_n$ for each of frequency values $F_n$. Each frequency value $F_n$ within high frequency and polarizability data profile 50 corresponds to a single magnetic polarizability value $M_n$. In some embodiments, processor 40 is operatively coupled to a computer storage medium 45. In various embodiments, computer storage medium 45 may be non-volatile random access memory, hard disk drives or optical discs.

High frequency and polarizability data profile 50 includes a data object having an array of magnetic polarizability values $M_n$ and frequency values $F_n$. Frequency values $F_n$ correspond to the frequencies generated by frequency generator 10 and may include a preselected range of frequency values $F_n$ ranging from approximately 100 kHz to approximately 50 MHz. The number of frequency values $F_n$ ranges from approximately 10 to approximately 200. In some embodiments, high frequency and polarizability data profile 50 is located on computer storage medium 45.

Optionally, system 100 includes a searchable database 60 operatively coupled to processor 40. At least one high frequency and polarizability data profile 50 is stored in a searchable database 60. In some embodiments, searchable database 60 contains multiple high frequency and polarizability data profiles 50. Each high frequency and polarizability data profile 50 forms a magnetic polarizability pattern for different objects of interest O, allowing for comparison between high frequency and polarizability data profiles 50 within searchable database 60. In such embodiments, processor 40 may be configured with software to search searchable database 60. In some embodiments, searchable database 60 is located on computer storage medium 45.

Figure 2:
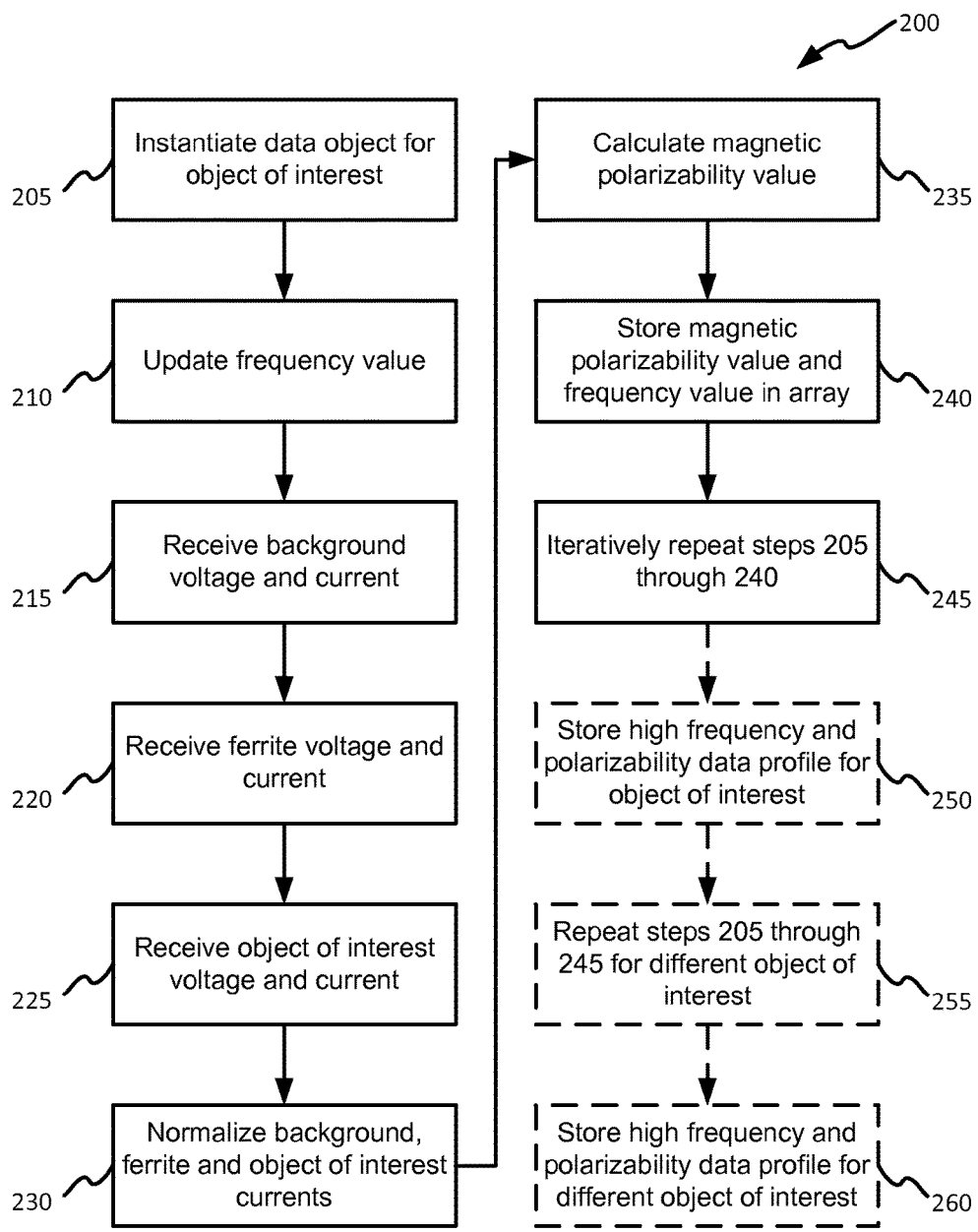
FIG. 2 illustrates a flowchart of an exemplary method for creating a high frequency and polarizability data profile for an object of interest.

FIG. 2 illustrates a flowchart of an exemplary method 200 for creating a high frequency and polarizability data profile 50 for an object of interest O.

In step 205, method 200 instantiates a data object for object of interest O. The data object includes an array to store a plurality of magnetic polarizability values $M_n$ and a plurality of frequency values $F_n$.

In step 210, method 200 updates frequency value $F_n$ to correspond to the frequency of a signal applied to transmitter coil 20.

In step 215, method 200 receives a measured background voltage $\widehat{V_B}$ and an initial background transmitter current $\widehat{i_{T_i}^B}$.

In step 220, method 200 receives a measured ferrite voltage $\widehat{V_F}$ and an initial ferrite transmitter current $\widehat{i_{T_i}^F}$.

In step 225, method 200 receives a measured voltage of object of interest $\widehat{V_O}$ and an initial transmitter current of object of interest $\widehat{i_{T_i}^O}$.

In step 230, method 200 normalizes initial background transmitter current $\widehat{i_{T_i}^B}$, initial ferrite transmitter current $\widehat{i_{T_i}^F}$ and initial transmitter current of object of interest $\widehat{i_{T_i}^O}$ to a coil background transmitter current $\hat{i_T^B}$, a coil ferrite transmitter current $\hat{i_T^F}$ and a coil transmitter current of object of interest O $\hat{i_T^O}$, respectively, to adjust for sampling conditions. In one embodiment, step 230 involves modeling initial background transmitter current $\widehat{i_{T_i}^B}$, initial ferrite transmitter current $\widehat{i_{T_i}^F}$ and initial transmitter current of object of interest O $\widehat{i_{T_i}^O}$ in a physically accurate numerical electromagnetic model of transmitter coil 20 and receiver coil 30.

In step 235, method 200 calculates magnetic polarizability value $M_n$ of object of interest O utilizing measured background voltage $\widehat{V_B}$, measured ferrite voltage $\widehat{V_F}$, measured voltage of object of interest $\widehat{V_O}$, coil background transmitter current $\hat{i_T^B}$, coil ferrite transmitter current $\hat{i_T^F}$ and coil transmitter current of object of interest $\hat{i_T^O}$. In one embodiment, step 235 involves using the equation $$M_n = \frac{\dfrac{\widehat{V_O}}{\hat{i_T^O}} - \dfrac{\widehat{V_B}}{\hat{i_T^B}}}{\dfrac{\widehat{V_F}}{\hat{i_T^F}} - \dfrac{\widehat{V_B}}{\hat{i_T^B}}}$$

In step 240, method 200 stores magnetic polarizability value $M_n$ and frequency value $F_n$ in the array to create high frequency and polarizability data profile 50 for object of interest O.

In step 245, method 200 iteratively repeats steps 205 through 240. Method 200 repeats these steps n times, wherein n numbers between approximately 10 and approximately 200. This will create a new magnetic polarizability value $M_n$ for each new frequency value $F_n$ used during each iteration.

In optional step 250, method 200 stores high frequency and polarizability data profile 50 in searchable database 60.

In optional step 255, method 200 repeats steps 205 through 245 to create a high frequency and polarizability data profile 50 for a different object of interest O.

In optional step 260, method 200 stores high frequency and polarizability data profile 50 for the different object of interest O in searchable database 60 to populate searchable database 60 with a plurality of high frequency and polarizability data profiles 50 for different objects of interest O.

It will be understood that many additional changes in the details, materials, procedures and arrangement of parts, which have been herein described and illustrated to explain the nature of the invention, may be made by those skilled in the art within the principle and scope of the invention as expressed in the appended claims.

It should be further understood that the drawings are not necessarily to scale. Instead, emphasis has been placed upon illustrating the principles of the invention. Like reference numerals in the various drawings refer to identical or nearly identical structural elements. Moreover, the terms "about," "substantially" or "approximately" as used herein may be applied to modify any quantitative representation that could permissibly vary without resulting in a change in the basic function to which it is related.

What is claimed is:

1. A computer apparatus having non-transitory memory and a processor for identifying non-metallic objects, comprised of:
   a first non-transitory memory component which stores at least one profile array for an object of interest, configured to store a plurality of magnetic polarizability data values $M_1$-$M_n$ associated with n corresponding plurality of frequency values $F_1$-$F_n$ where n is the number of said frequency values measured;
   a processor configured to iteratively invoke a function n times, wherein said
     processor is configured with a first non-transitory memory component which includes instructions to receive and store each of said frequency values $F_1$-$F_n$, wherein said $F_1$-$F_n$ represent a frequency of a signal applied to a transmitter coil,
     a second non-transitory memory component configured with instructions to receive and store a first set of electric attribute values representing a measured background voltage $\widehat{V_B}$, an initial background transmitter current $i_{T_i}^{\widehat{B}}$, a measured ferrite voltage $\widehat{V_F}$, an initial ferrite transmitter current $i_{T_i}^{\widehat{F}}$, a measured voltage of said object of interest $\widehat{V_D}$ and an initial transmitter current of object of interest $i_{T_i}^{\widehat{D}}$,
   a component configured with memory and instructions to retrieve said first set of electric attribute values as input and perform a function for normalizing said initial background transmitter current $i_{T_i}^{\widehat{B}}$, said initial ferrite transmitter current $i_{T_i}^{\widehat{F}}$ and said initial transmitter current of object of interest $i_{T_i}^{\widehat{D}}$ to a coil background transmitter current $i_{T_i}^{\widehat{B}}$, a coil ferrite transmitter current $i_{T_i}^{\widehat{F}}$ and a coil transmitter current of said object of interest $i_{T_i}^{\widehat{D}}$, respectively, to adjust for sampling conditions,
   a processing component configured with memory and instructions for calculating said magnetic polarizability value $M_n$ of said object of interest utilizing said measured background voltage $\widehat{V_B}$, said measured ferrite voltage $\widehat{V_F}$, said measured voltage of said object of interest $\widehat{V_D}$, said coil background transmitter current $i_{T_i}^{\widehat{B}}$, said coil ferrite transmitter current $i_{T_i}^{\widehat{F}}$ and said coil transmitter current of said object of interest $i_{T_i}^{\widehat{D}}$, and
   a second processing component configured with memory and instructions for storing said magnetic polarizability value $M_n$ and said frequency value $F_n$ in said array to create said high frequency and polarizability data profile for said object of interest, wherein said object of interest is a non-metallic object with conduction between approximately 1 Siemens per meter (S/m) and approximately 100,000 S/m.

2. The apparatus of claim 1, wherein normalizing said initial background transmitter current $i_{T_i}^{\widehat{B}}$, said initial ferrite transmitter current $i_{T_i}^{\widehat{F}}$ and said initial transmitter current of object of interest $i_{T_i}^{\widehat{D}}$ comprises modeling said initial background transmitter current $i_{T_i}^{\widehat{B}}$, said initial ferrite transmitter current $i_{T_i}^{\widehat{F}}$ and said initial transmitter current of object of interest $i_{T_i}^{\widehat{D}}$ in a physically accurate numerical electromagnetic model of said transmitter coil and a receiver coil.

3. The apparatus of claim 1, wherein calculating said magnetic polarizability value $M_n$ of said object of interest utilizes the equation:

$$M_n = \frac{\frac{\widehat{V_D}}{i_T^{\widehat{D}}} - \frac{\widehat{V_B}}{i_T^{\widehat{B}}}}{\frac{\widehat{V_F}}{i_T^{\widehat{F}}} - \frac{\widehat{V_B}}{i_T^{\widehat{B}}}}.$$

4. The apparatus of claim 1, wherein n numbers between approximately 10 and approximately 200.

5. The apparatus of claim 1, wherein said frequency value $F_n$ ranges from approximately 100 kHz to approximately 50 MHz.

6. The apparatus of claim 1, further comprising a database processor configured with memory and instructions for storing said high frequency and polarizability data profile in a searchable database.

7. The apparatus of claim 6, further comprising a high frequency and polarizability data profile for a different object of interest.

8. The apparatus of claim 7, wherein said database processor is further configured with memory and instructions for storing said high frequency and polarizability data profile for said different object of interest in said searchable database to populate said searchable database with a plurality of high frequency and polarizability data profiles.

9. A high-frequency electromagnetic induction system apparatus comprising:
   a frequency generator operatively coupled to a transmitter coil; and
   a receiver coil operatively coupled to a processor configured with memory and instructions to perform a method for creating a high frequency and polarizability data profile for an object of interest, said method comprising the steps of:
     instantiating a data object for an object of interest wherein said data object comprises an array to store a plurality of magnetic polarizability values $M_1$-$M_n$ and a plurality of frequency values $F_1$-$F_n$, and
     iteratively invoking a function n times where n is the number of said frequency values measured, wherein said function comprises the steps of:
       updating said frequency value $F_n$ to correspond to the frequency of a signal applied to a transmitter coil,
       receiving a measured background voltage $\widehat{V_B}$ and an initial background transmitter current $i_{T_i}^{\widehat{B}}$,
       receiving a measured ferrite voltage $\widehat{V_F}$ and an initial ferrite transmitter current $i_{T_i}^{\widehat{F}}$, receiving a measured voltage of said object of interest $V_O$ and an initial transmitter current of object of interest $i_{T_1}^O$, normalizing said initial background transmitter current $i_{T_1}^B$, said initial ferrite transmitter current $i_{T_1}^F$ and said initial transmitter current of object of interest $i_{T_1}^O$ to a coil background transmitter current $i_{T_1}^B$, a coil ferrite transmitter current $i_{T_1}^F$ and a coil transmitter current of said object of interest $i_{T_1}^O$, respectively, to adjust for sampling conditions, calculating said magnetic polarizability value $M_n$ of said object of interest utilizing said measured background voltage $V_B$, said measured ferrite voltage $V_F$, said measured voltage of said object of interest $V_O$, said coil background transmitter current $i_{T_1}^B$, said coil ferrite transmitter current $i_{T_1}^F$ and said coil transmitter current of said object of interest $i_{T_1}^O$, and storing said magnetic polarizability value $M_n$ and said frequency value $F_n$ in said array to create said high frequency and polarizability data profile for said object of interest, wherein said object of interest is a non-metallic object with conduction between approximately 1 Siemens per meter (S/m) and approximately 100,000 S/m.

10. The apparatus of claim 9, wherein said frequency generator is configured to generate a plurality of frequencies ranging from approximately 100 kHz to approximately 50 MHz.

11. The apparatus of claim 10, wherein said plurality of frequencies number n.

12. The apparatus of claim 11, wherein n numbers between approximately 10 and approximately 200.

13. The apparatus of claim 9, further comprising a searchable database operatively coupled to said processor.

14. The apparatus of claim 13, wherein said searchable database comprises a plurality of high frequency and polarizability data profiles.

15. The apparatus of claim 9, which further includes a non-transitory computer-readable medium with at least one high frequency and polarizability data profile for an object of interest, said at least one high frequency and polarizability data profile comprising a data object for said object of interest wherein said data object comprises an array storing a plurality of magnetic polarizability values $M_1$-$M_n$ and a plurality of frequency values $F_1$-$F_n$.

16. The apparatus of claim 15, wherein n numbers between approximately 10 and approximately 200.

17. The apparatus of claim 15, wherein said frequency value $F_n$ ranges from approximately 100 kHz to approximately 50 MHz.

18. The apparatus of claim 15, wherein said computer storage medium further comprises a searchable database.

19. The apparatus of claim 18, wherein said searchable database comprises a plurality of high frequency and polarizability data profiles.

20. The apparatus of claim 15, wherein said computer storage medium is operatively connected to a processor configured with software for searching said database.

* * * * *